(12) United States Patent
Lowther (10) Patent No.: US 7,936,542 B2
(45) Date of Patent: May 3, 2011

(54) ELECTRONIC GROUND DETECTION APPARATUS FOR USE ON GROUND DETECTOR RING OF POWER GENERATING SYSTEM

(75) Inventor: Gary R. Lowther, Casselberry, FL (US)

(73) Assignee: Siemens Energy, Inc., Orlando, FL (US)

( * ) Notice: Subject to any disclaimer, the term of this patent is extended or adjusted under 35 U.S.C. 154(b) by 520 days.

(21) Appl. No.: 12/042,694

(22) Filed: Mar. 5, 2008

(65) Prior Publication Data

US 2008/0239595 A1   Oct. 2, 2008

Related U.S. Application Data

(60) Provisional application No. 60/920,184, filed on Mar. 27, 2007.

(51) Int. Cl.
*H02H 3/00* (2006.01)
(52) U.S. Cl. .......................................... 361/42
(58) Field of Classification Search .................. 361/42
See application file for complete search history.

(56) References Cited

U.S. PATENT DOCUMENTS

| | | | |
|---|---|---|---|
| 3,303,410 A | | 2/1967 | Hoover et al. |
| 3,510,752 A | * | 5/1970 | Raver et al. ............ 322/28 |
| 3,593,123 A | * | 7/1971 | Williamson et al. ...... 324/545 |
| 3,727,123 A | * | 4/1973 | Smith ................. 322/99 |
| 3,947,710 A | * | 3/1976 | Miyamoto ............ 310/153 |
| 4,164,705 A | | 8/1979 | Whitney et al. |
| 4,542,468 A | | 9/1985 | Taniguti |
| 4,551,811 A | | 11/1985 | Taniguti |
| 4,556,946 A | | 12/1985 | Taniguti |
| 4,853,818 A | | 8/1989 | Emery et al. |
| 4,884,034 A | | 11/1989 | Guzman |
| 4,897,756 A | | 1/1990 | Zylstra |
| 4,929,901 A | | 5/1990 | Kimball et al. |
| 5,126,658 A | | 6/1992 | Twerdochlib |
| 6,081,122 A | | 6/2000 | McCary |
| 6,188,553 B1 | | 2/2001 | Moisin |
| 6,693,778 B1 | | 2/2004 | Pittman et al. |
| 6,798,210 B2 | | 9/2004 | Goodrich et al. |
| 7,035,065 B2 | | 4/2006 | McNally et al. |
| 7,253,639 B2 | | 8/2007 | Horikoshi et al. |
| 7,256,974 B2 | | 8/2007 | McNally et al. |
| 7,295,016 B2 | | 11/2007 | Kishibata et al. |

* cited by examiner

*Primary Examiner* — Stephen W Jackson
*Assistant Examiner* — Tien Mai (57) ABSTRACT

A ground detection apparatus for use in a power generating system including an excitation circuit and a driven rotatable shaft. A ground detector ring is disposed on the rotatable shaft of the power generating system. A ground detection transmitter is mounted on the ground detector ring and in electrical communication with the excitation circuit of the power generating system. The ground detection transmitter is utilized to detect ground faults in the excitation circuit of the power generating system and to send a signal associated with ground faults detected by the ground detection transmitter. A ground detection receiver is associated with a stationary portion of the power generation system and is in communication with the ground detection transmitter for receiving the signal associated with ground faults detected and sent by the ground detection transmitter.

14 Claims, 5 Drawing Sheets

ELECTRONIC GROUND DETECTION APPARATUS FOR USE ON GROUND DETECTOR RING OF POWER GENERATING SYSTEM

CROSS-REFERENCE TO RELATED APPLICATION

This application claims the benefit of U.S. Provisional Application Ser. No. 60/920,184, filed Mar. 27, 2007, the entire disclosure of which is incorporated by reference herein.

FIELD OF THE INVENTION

The present invention relates generally to a ground detection apparatus for use in a power generating system and, more particularly, to a ground detection apparatus that is mounted on a rotatable ground detection ring of a brushless exciter used in a power generating system.

BACKGROUND OF THE INVENTION

Brushless alternating current (AC) excitation systems are widely used for supplying direct current (DC) field excitation to synchronous dynamoelectric machines such as large AC power generators. Such brushless AC excitation systems include a main exciter having a stationary field structure and a rotating armature member. A diode wheel assembly or rotating rectifier assembly is carried on a common shaft with the rotating armature member and is connected thereto to provide a direct current output. The output of the diode wheel assembly is supplied to field windings of the main generator which also rotates with the rotating armature member and the diode wheel assembly.

A problem of great concern in brushless excitation systems is the detection of rotary circuit malfunctions, such as, for example, ground faults in the field windings of the main generator, shorted diodes or open fuses in diode circuitry of the diode wheel assembly, line-to-line short circuits in the rotating armature member, and phase-to-phase short circuits in the rotating armature member. These types of malfunctions, if undetected, may result in severe and costly damage to the machine and consequential damage to equipment to which the machine delivers power. The effect is particularly serious in the case of a large synchronous generator which supplies critical power to users who may be severely damaged by a sudden power fluctuation or reduction. Therefore, early detection of rotary circuit malfunctions of the brushless excitation system is important, especially since such a machine may continue to operate in apparently normal fashion even after one or more malfunctions occur.

Circuit malfunction detection systems that employ components, such as slip rings for transmitting malfunction information, are not desirably used in operating environments where the use of sparking surfaces should be avoided, such as in a brushless AC excitation system. In a system disclosed by U.S. Pat. No. 3,303,410, the entire disclosure of which is hereby incorporated by reference herein, a ground detection arrangement comprises a pair of rotating shaft mounted collector rings that contact non-rotating brushes during ground fault testing. The ground detection arrangement is metered periodically during operation of the power generating system to monitor for ground faults in the excitation circuit. While this arrangement has been effective for periodically monitoring for ground faults in the excitation circuit, the contact between the brushes and the collector rings may cause sparking and is therefore undesirable. Further, as the system is employed periodically, continuous monitoring for ground faults is not facilitated.

It is desirable to provide alternate means that do not employ the use of slip rings or other sparking surfaces to provide an indication of circuit malfunctions within the rotary electric circuits of the brushless excitation system. One such system employs a strobe light arrangement that is utilized for detecting a failure of fuse members within a diode wheel assembly. However, in this arrangement, a fuse must be located in a position for physical inspection of a fuse indicator, which is actuated when the fuse is opened. As a result, the fuses are mounted on the end surface of the diode wheel. As the synchronous dynamoelectric machines become larger, the number of fuses, or sizes thereof, are increased, which results in an increase of the diameter of the diode wheel, which is undesirable.

SUMMARY OF THE INVENTION

In accordance with a first aspect of the present invention, a ground detection apparatus is provided for use in a power generating system including an excitation circuit and a driven rotatable shaft. The ground detection apparatus comprises a ground detector ring disposed on the rotatable shaft of the power generating system, a ground detection transmitter mounted on the ground detector ring and in electrical communication with the excitation circuit of the power generating system, and a ground detection receiver associated with a stationary portion of the power generation system. The ground detection transmitter is utilized to detect ground faults in the excitation circuit and to send a signal associated with the ground faults detected thereby. The ground detection receiver is in non-contacting communication with the ground detection transmitter and receives the signal associated with the ground faults detected and sent by the ground detection transmitter.

In accordance with a second aspect of the present invention, an electronic ground detection apparatus is provided for use in a power generating system including an excitation circuit and a driven rotatable shaft. The ground detection apparatus comprises a ground detector ring disposed on the rotatable shaft of the power generating system, a ground detection transmitter mounted on the ground detector ring and in electrical communication with the excitation circuit of the power generating system, and a ground detection receiver associated with a stationary portion of the power generation system. The ground detector ring includes apertures formed therein for receiving at least one fastener. The ground detection transmitter is utilized to detect ground faults in the excitation circuit and to send a signal associated with the ground faults detected thereby. The at least one fastener facilitates a mounting of a mounting structure to the ground detector ring. The mounting structure is mechanically coupled to the ground detection transmitter. The ground detection receiver is in non-contacting communication with the ground detection transmitter and receives the signal associated with the ground faults detected and sent by the ground detection transmitter.

In accordance with a third aspect of the present invention, an electronic ground detection apparatus is provided for use in a power generating system including an excitation circuit and a driven rotatable shaft. The ground detection apparatus comprises a ground detector ring disposed on the rotatable shaft of the power generating system, a ground detection transmitter mounted on the ground detector ring and in electrical communication with the excitation circuit, and a ground detection receiver associated with a stationary portion of the power generation system. The ground detector ring includes apertures formed therein for receiving at least one fastener and is positioned at a location defined between one of: a permanent magnet generator and a main exciter, and the diode wheel assembly and the main generator. The excitation circuit comprises is associated with the diode wheel and comprises at least electrical connection with field windings of the main generator. The diode wheel is disposed on the rotatable shaft and axially displaced thereon from the ground detector ring. The ground detection transmitter is utilized to detect ground faults in the excitation circuit and to send a signal associated with the ground faults detected thereby. At least one fastener rigidly affixes a mounting bracket to the ground detector ring. The mounting bracket is mechanically coupled to the ground detection transmitter. The ground detection receiver is in non-contacting communication with the ground detection transmitter and receives the signal associated with the ground faults detected and sent by the ground detection transmitter.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
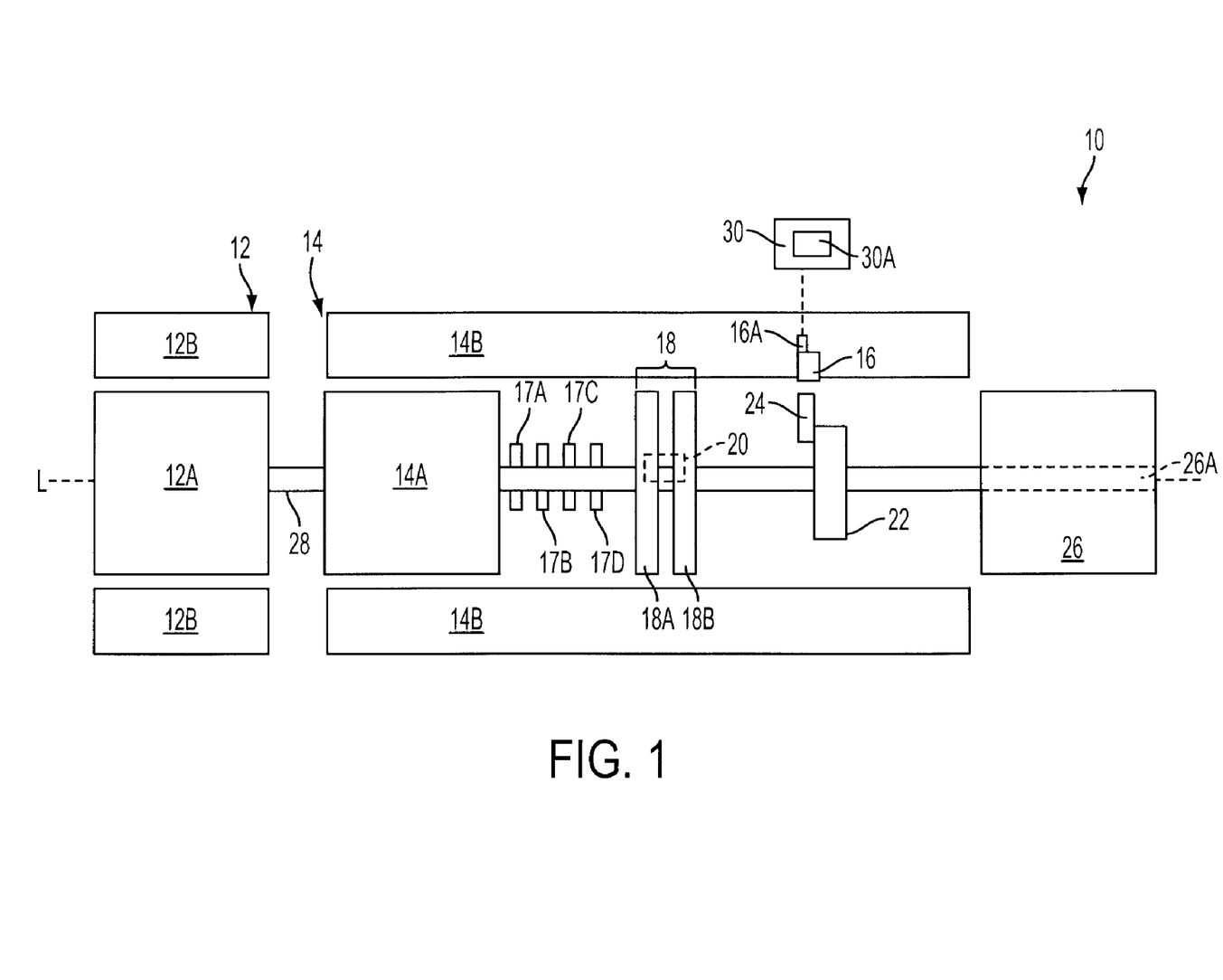
FIG. 1 is a diagrammatic illustration of a brushless AC exciter including an electronic ground detection apparatus for use in a power generating system in accordance with the invention.

Referring to FIG. 1, a brushless AC exciter 10, such as a brushless exciter manufactured by Westinghouse Electric Corporation under the designation Mark III brushless exciter, for use in a power generating system according to an embodiment of the invention is shown. The brushless AC exciter 10 comprises a permanent magnet generator 12 or pilot exciter, a main exciter 14, a plurality of connection rings 17A, 17B, 17C, 17D, a diode wheel assembly 18, an excitation circuit 20, a ground detector ring 22, and a main generator 26. The permanent magnet generator 12 comprises a rotating armature 12A and a stationary field structure 12B comprising stationary magnetic poles. The main exciter 14 comprises a rotating armature 14A surrounded by a stationary field structure 14B comprising stationary field poles. The diode wheel assembly 18 comprises a positive diode wheel 18A and a negative diode wheel 18B and is associated with the excitation circuit 20. The main generator 26 includes field windings 26A associated therewith. The rotating armature 12A of the permanent magnet generator 12, the rotating armature 14A of the main exciter 14, the connection rings 17A, 17B, 17C, 17D, the diode wheel assembly 18, the ground detector ring 22, and the field windings 26A of the main generator 26 are mounted to and rotate with a rotatable shaft 28 about a longitudinal axis L during operation of the brushless AC exciter 10.

Figure 2:
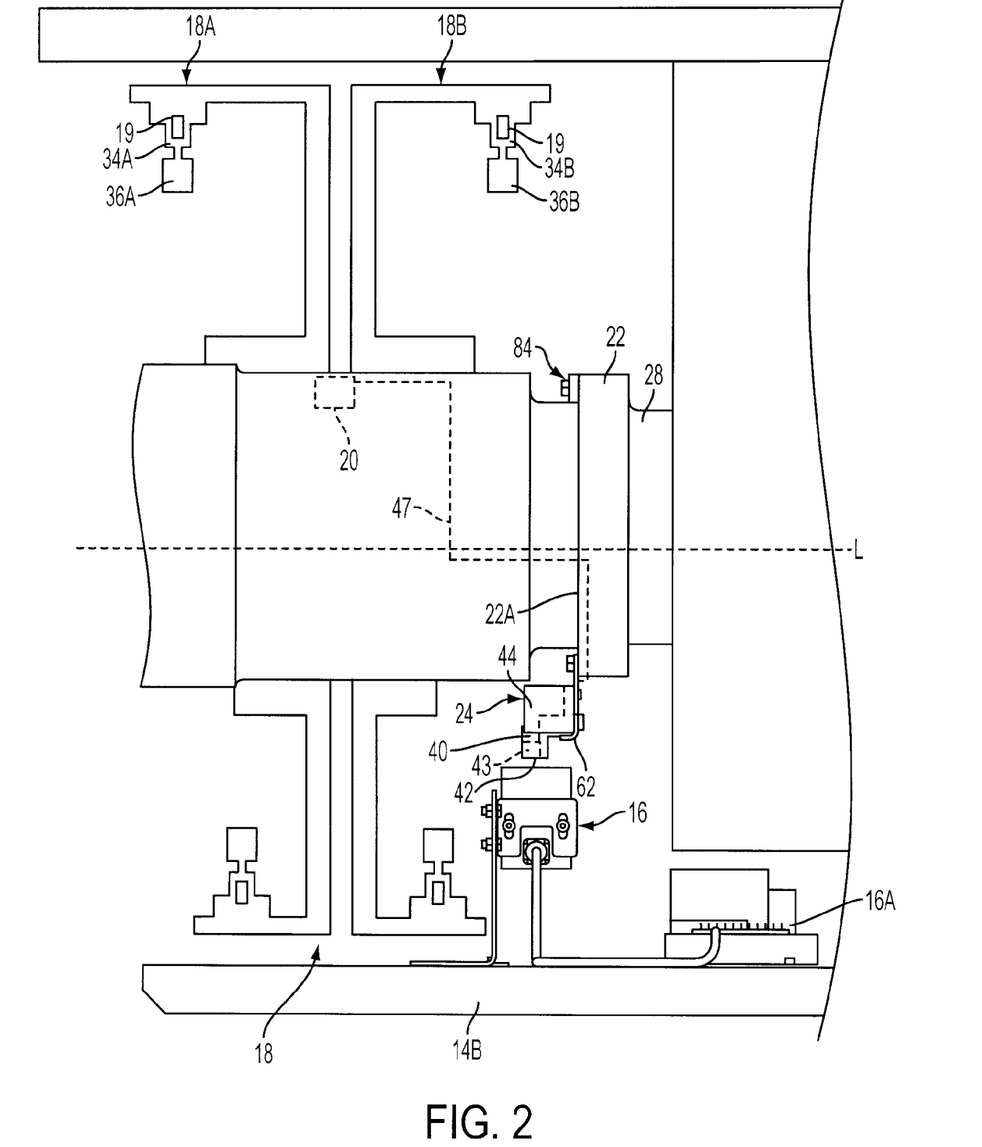
FIG. 2 is a side sectional view of a portion of the brushless AC exciter including the electronic ground detection apparatus illustrated in FIG. 1.

Referring to FIG. 2, the positive diode wheel 18A and the negative diode wheel 18B of diode wheel assembly 18 include respective diodes 34A, 34B and corresponding fuses 36A, 36B that comprise diode wheel assembly circuitry 19. Typically, between about 6 and about 36 diodes 34A, 34B and corresponding fuses 36A, 36B are disposed in an annular array on both the positive and negative diode wheels 18A, 18B, respectively.

As seen in FIGS. 1 and 2, the excitation circuit 20 associated with the diode wheel assembly 18 may comprise electrical communication with the diode wheel assembly circuitry 19, the rotating armature 12A of the permanent magnet generator 12, the rotating armature 14A of the main exciter 14, the connection rings 17A, 17B, 17C, 17D, the field windings 26A of the main generator 26, and any associated electrical paths to the diode wheel assembly 18, which may include radial leads, axial leads, and other components. In a preferred embodiment, the excitation circuit 20 comprises at least electrical communication with the field windings 26A of the main generator 26.

In accordance with the present invention, the brushless AC exciter 10 is further provided with a ground detection receiver 16 and an associated ground detection transmitter 24, as shown in FIGS. 1 and 2. In a preferred embodiment, the ground detection receiver 16 is mounted to the stationary field structure 14B of the main exciter 14 so as to be substantially axially aligned with the ground detection transmitter 24, as depicted in FIGS. 1 and 2. However, the ground detection receiver 16 could be mounted to any stationary structure located within the vicinity of the ground detection transmitter 24 as desired, so long as a signal sent from the ground detection transmitter 24 can be received by the ground detection receiver 16 without mechanical contact between the ground detection receiver 16 and the ground detection transmitter 24. In the embodiment shown, the ground detection receiver 16 is an optical type receiver, although any suitable type of receiver that is capable of receiving a corresponding signal from the ground detection transmitter 24 could be used, such as, for example, a radio frequency (RF) receiver used with an associated RF type transmitter, as discussed below for the embodiment illustrated in FIG. 5.

As shown in FIG. 1, the ground detection receiver 16 includes associated receiver circuitry 16A that is in communication with an alarm 30. The alarm 30 has an associated alarm indicating circuit 30A, such as the alarm and alarm indicating circuit disclosed in U.S. Pat. No. 3,727,123 entitled BRUSHLESS GENERATOR FIELD GROUND DETECTION SYSTEM, the entire disclosure of which is incorporated herein by reference. Since the alarm 30 and alarm indicating circuit 30A are not integrally formed with the ground detection receiver 16, the alarm 30 and alarm indicating circuit 30A may be located at a position remote from the ground detection receiver 16.

Figure 3:
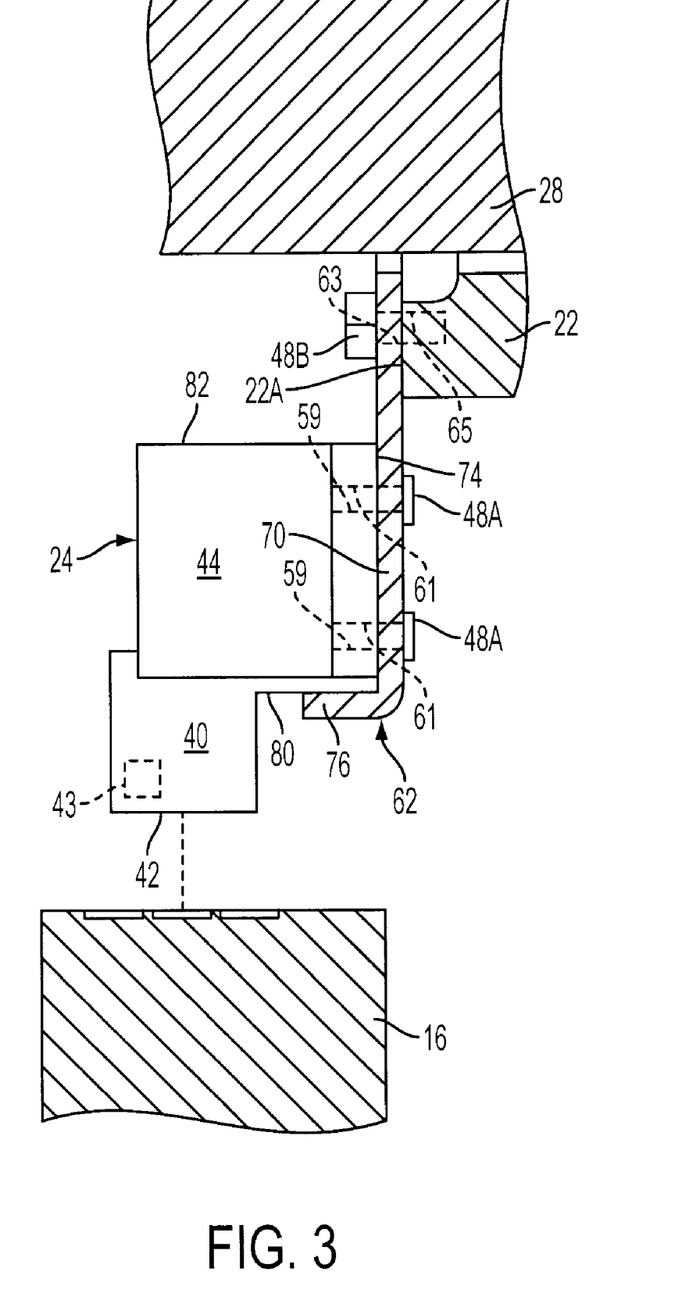
FIG. 3 is an enlarged cross sectional view of the electronic ground detection apparatus disposed on the ground detector ring illustrated in FIGS. 1 and 2.

As shown in FIGS. 2 and 3 the ground detection transmitter 24 is mounted to a radial outer surface 22A of the ground detector ring 22. The ground detection transmitter 24 may be an optical type transmitter, such as the 2440-INS-408 model, commercially offered for sale by Electric Machinery Company, Inc., of Minneapolis, Minn. The optical type ground detection transmitter 24 may operate with a known optical type receiver, such as the optical type receiver disclosed in U.S. Pat. No. 3,727,123 referenced above. Other types of transmitters, such as RF type transmitters, may be used.

As more clearly shown in FIG. 3, the ground detection transmitter 24 includes a first portion 40 that comprises an outer glass cover 42 and transmitter circuitry 43 disposed therein. The transmitter circuitry 43 is in electrical communication with the excitation circuit 20, as depicted by line 47 (FIG. 2). A second portion 44 of the ground detection transmitter 24 includes apertures 59 formed therein for receiving first fasteners 48A that facilitate mounting the ground detection transmitter 24 to the ground detector ring 22, as shown in FIG. 3. In the embodiment shown, the first fasteners 48A are bolts, but any type of mechanical fastener may be used.

Figure 4:
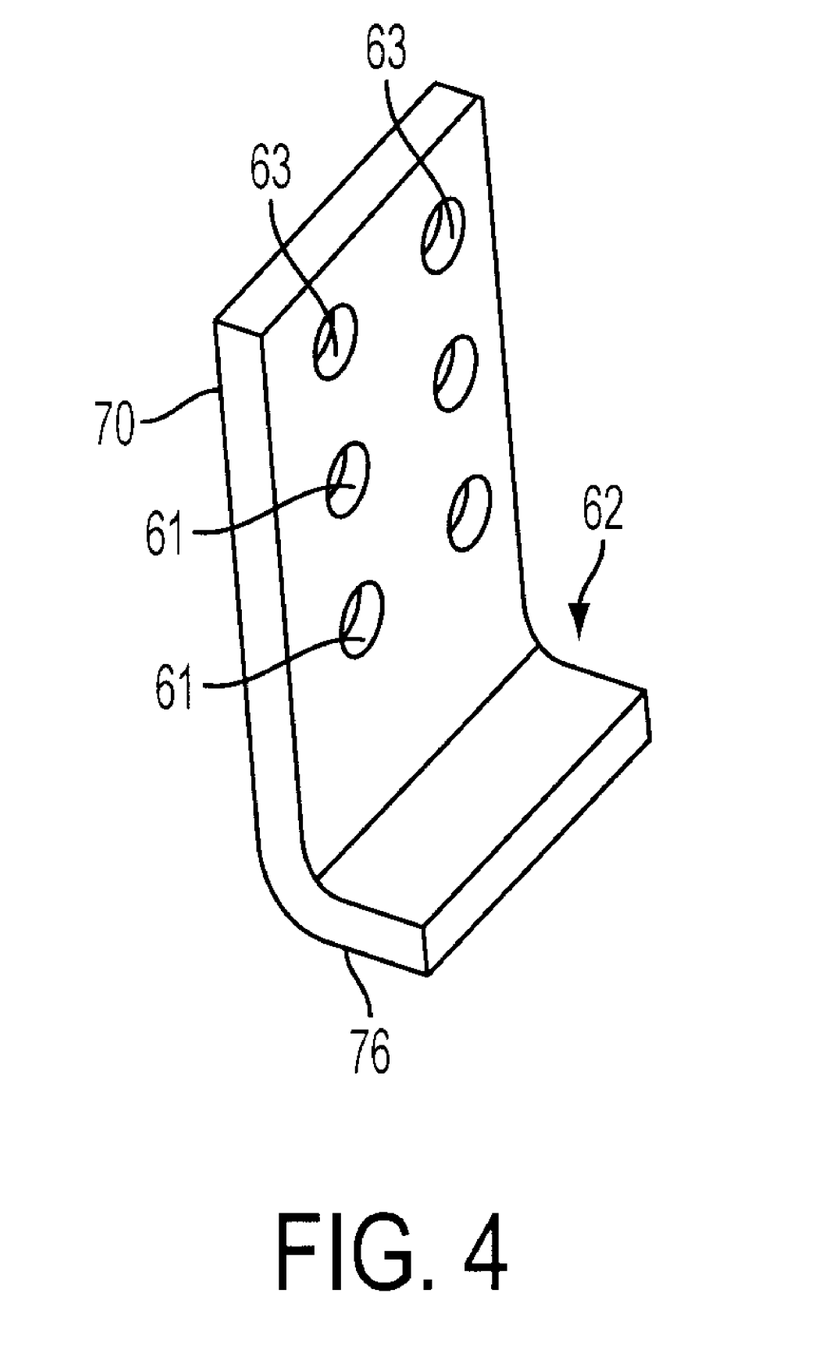
FIG. 4 is an enlarged perspective view of a mounting structure used to mount the electronic ground detection apparatus of FIG. 3 to the ground detector ring illustrated in FIGS. 1 and 2.

The first fasteners 48A are adapted to be inserted through the apertures 59 formed in the ground detection transmitter 24 and through corresponding first apertures 61 formed in a mounting structure 62, see FIG. 4. The mounting structure 62 includes second apertures 63 formed therein radially spaced from the first apertures 61 for receiving second fasteners 48B. In the embodiment shown, the second fasteners 48B are bolts, but any type of mechanical fastener may be used. The second fasteners 48B are adapted to be inserted through the second apertures 63 formed in the mounting structure 62 and through corresponding apertures 65 formed in the ground detector ring 22. It should be understood that the first or second fasteners 48A, 48B could facilitate a direct mounting of the ground detection transmitter 24 to the ground detector ring 22 without use of the mounting structure 62. Washers (not shown) may be disposed between heads of the bolts and the ground detection transmitter 24. The washers may be formed from a non-conductive and insulating material such as, for example, micarta or green glass epoxy.

As seen in FIG. 4, the mounting structure 62 comprises a bracket having an L-shaped cross section, although it is understood that brackets having other cross sectional shapes could be used. In the embodiment shown, the mounting structure 62 is formed from aluminum, although other suitable materials capable of withstanding mechanical and thermal loads during operation of the power generating system may be used to form the mounting structure 62, such as an aluminum alloy or a non-conductive and insulating material, for example, micarta, green glass epoxy, or a plastic.

Referring back to FIG. 3, a radially extending portion 70 of the mounting structure 62 is disposed between the radially outer surface 22A of the ground detector ring 22 and a radially extending surface 74 of the second portion 44 of the ground detection transmitter 24. An axially extending portion 76 of the mounting structure 62 extends axially outwardly toward the ground detection transmitter 24 adjacent a radially outer portion 80 of the ground detection transmitter 24. It should be understood that the mounting structure 62 could be alternately oriented as desired, such as, for example, wherein the axially extending portion 76 of the mounting structure 62 extends axially outwardly toward the ground detection transmitter 24 adjacent a radially inner portion 82 of the ground detection transmitter 24, or wherein the ground detection transmitter 24 is mounted to the axially opposed side of the ground detector ring 22. The mounting structure 62 adds rigidity to the ground detection transmitter 24. In addition, the mounting structure 62 may be dimensioned and/or configured to facilitate mounting the ground detection transmitter 24 to ground detector rings having various diameters and geometries.

Optionally, one or more counterbalancing weight assemblies 84 may be disposed on the ground detector ring 22 as shown in FIG. 2. In the embodiment shown, one counterbalancing weight assembly 84 is mounted to the ground detector ring 22 on a radially opposed side of the ground detector ring 22 from the ground detection transmitter 24. However, additional counterbalancing weight assemblies could be disposed on ground detector ring 22 as desired, such as an annular array of counterbalancing weight assemblies, for example. The counterbalancing weight assembly 84 is weighted so as to facilitate to counterbalance the weight of the ground detection transmitter 24 on the ground detector ring 22 during rotation with the rotatable shaft 28.

Referring to FIG. 1, during operation of the brushless AC exciter 10, the stationary field structure 12B of the permanent magnet generator 12 induces a voltage and current into the rotating armature 12A of the permanent magnet generator 12. The voltage output is tied to an automatic voltage regulator (not shown) which controls the voltage level and also feeds this signal to the stationary field structure 14B of the main exciter 14. This in turn induces a voltage and current flow in the rotating armature 14A of the main exciter 14. This current flow is carried by the connection rings 17A, 17B, 17C, 17D and leads to the excitation circuit 20 of the diode wheel assembly 18, which rectifies (converts) the AC signal into a DC current and voltage. The DC current then flows through the radial leads and the main leads and into the field windings 26A of the main generator 26.

The ground detection transmitter 24 monitors the excitation circuit 20 of the brushless AC exciter 10 for a flow of current to ground i.e. low resistance to ground (hereinafter "ground fault"), and is powered, for example, by an AC signal received from the main exciter 14. The ground detection transmitter 24 emits an optical signal when energized as it rotates with the ground detector ring 22 and the rotatable shaft 28. It should be understood that the ground detection transmitter 24 may be selected so as to emit any suitable type and amount of energy, although the preferred embodiments emit optical energy or RF energy. When there are no ground faults in the excitation circuit 20, the ground detection transmitter 24 sends a corresponding signal that is received by the ground detection receiver 16. When a ground fault is detected in the excitation circuit 20 by the ground detection transmitter 24, the signal sent by the ground detection transmitter 24 is terminated and is thus not available for receipt by the ground detection receiver 16, at which time the ground detection receiver 16 may then trigger the alarm 30. When the alarm 30 is triggered, appropriate steps can be taken for correcting the problem. It is understood that the ground detection transmitter 24 may send a modified signal corresponding to a ground fault condition when a ground fault is detected by the ground detection transmitter 24 rather than terminating the signal emitted therefrom without departing from the spirit and scope of the invention.

The mounting of the ground detection transmitter 24 to the ground detector ring 22 permits the excitation circuit 20, which, in prior art systems, was previously electrically connected to the ground detector ring 22, to be rewired directly into the ground detection transmitter 24 requiring minimal reconfiguration of the system. Further, the ground detection transmitter 24 facilitates continuous ground fault detection for the excitation circuit 20 of the brushless AC exciter 10, as opposed to prior art systems that implemented periodic ground fault detection. Moreover, since brushes and other types of contacting elements are not employed for the communication between the ground detection transmitter 24 and the ground detection receiver 16, sparking caused by contact therebetween is avoided. Additionally, the axially extending portion 76 of the mounting structure 62 assists in retaining the ground detection transmitter 24 in place while centrifugal forces exerted on the ground detection transmitter 24 bias the ground detection transmitter 24 radially outwardly.

Although the ground detector ring 22 and corresponding ground detection transmitter 24 have been depicted as being disposed between the diode wheel assembly 18 and the main generator 26, it is understood that the ground detector ring 22 and corresponding ground detection transmitter 24 could be disposed in other locations on the rotatable shaft 28 of the brushless AC exciter 10. For example, the ground detector ring 22 and corresponding ground detection transmitter 24 may be disposed between the permanent magnet generator 12 and the main exciter 14, so long as communication with the excitation circuit 20 and with the ground detection receiver 16 are enabled.

Figure 5:
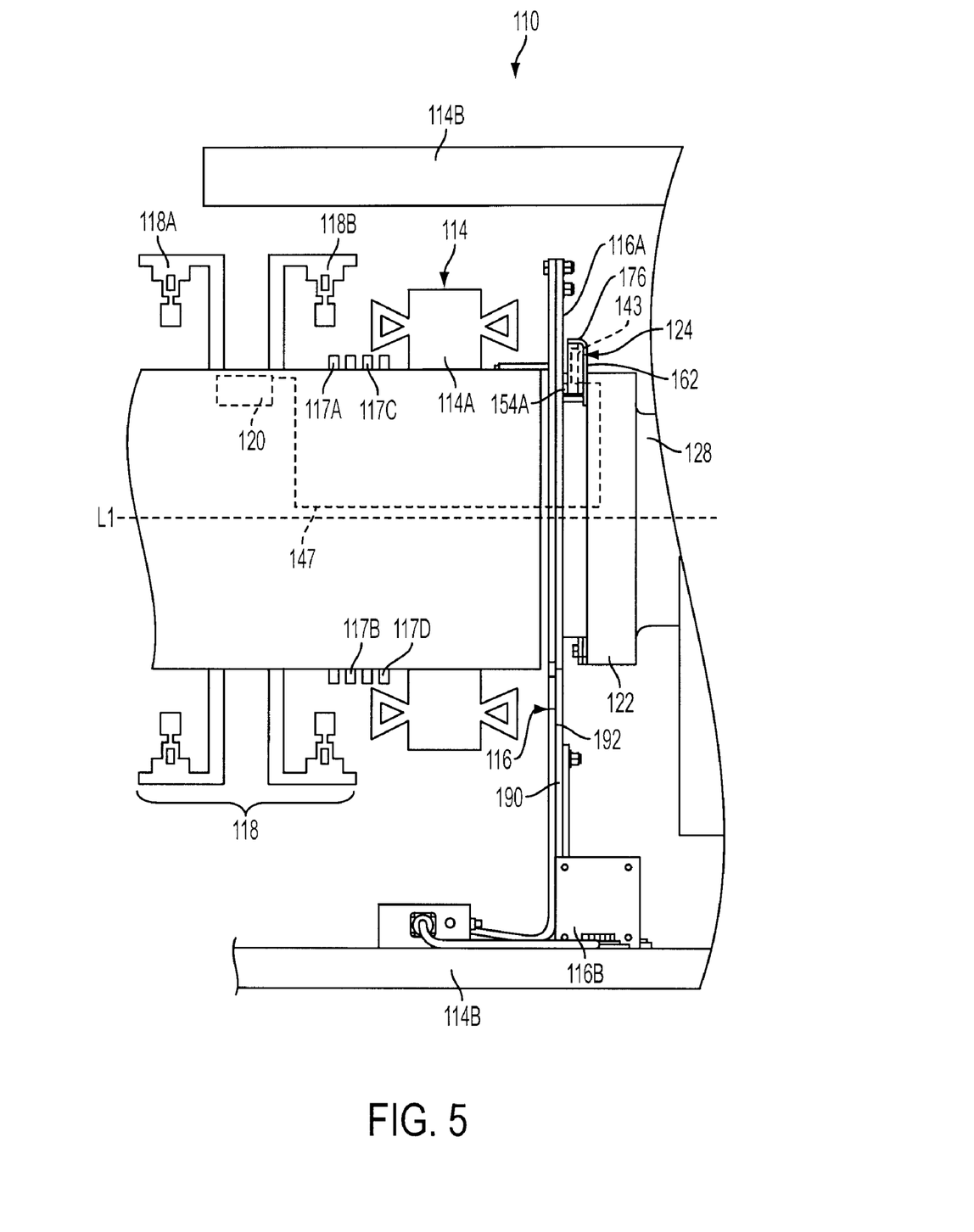
FIG. 5 is a side sectional view of a portion of a brushless AC exciter including an electronic ground detection apparatus in accordance with another embodiment of the invention.

FIG. 5 illustrates a portion of a brushless AC exciter 110 including a ground detection transmitter 124 in accordance with another embodiment of the invention, where elements of the embodiment of FIG. 5 corresponding to the embodiment of FIGS. 1-4 are labeled with the same reference number increased by 100. The ground detection transmitter 124 illustrated in FIG. 5 is an RF type transmitter, such as the 2500-409 model, commercially offered for sale by Electric Machinery Company, Inc.

In this embodiment, the ground detection transmitter 124 is mounted to a ground detector ring 122 using first fasteners 154A that are inserted through radially and circumferentially aligned apertures (not shown) formed through the ground detection transmitter 124 and a mounting structure 162, and into ground detector ring 122. As discussed above for FIGS. 1-4, an axially extending portion 176 of the mounting structure 162 assists in retaining the ground detection transmitter 124 in place while centrifugal forces exerted thereon bias the ground detection transmitter 124 radially outwardly. The ground detection transmitter 124 includes transmitter circuitry 143 that is in communication with an excitation circuit 120 as depicted by line 147. The excitation circuit 120 is associated with a diode wheel assembly 118 comprising positive and negative diode wheels 118A, 118B.

As illustrated in FIG. 5, a rotatable shaft 128 having a longitudinal axis L1 supports the ground detector ring 122, a rotating armature 114A of a main exciter 114, a plurality of connection rings 117A, 117B, 117C, 117D, the diode wheel assembly 118, and other components discussed above for FIGS. 1-4 but not specifically shown in FIG. 5, including a rotating armature of a permanent magnet generator and field windings of a main generator. A mounting plate 190 is associated with a stationary portion of the brushless AC exciter 110 and is disposed around but not affixed to the rotatable shaft 128 between the ground detector ring 122 and the rotating armature 114A of the main exciter 114. The mounting plate 190 illustrated can be formed from a micarta or green glass epoxy, although the mounting plate 190 may be formed from any suitable material.

A stationary receiver 116 in non-contacting communication with the ground detection transmitter 124 comprises an antenna loop 116A having associated receiver circuitry 116B. The antenna loop 116A is disposed on a radial surface 192 of the mounting plate 190 and is adapted to receive RF signals from the ground detection transmitter 124. In the embodiment shown, the receiver circuitry 116B is in electrical communication with the antenna loop 116A and is located remotely from the antenna loop 116A. However, it is understood that the antenna loop 116A and the receiver circuitry 116B could be integrally formed, and may be mounted to any stationary structure located within the vicinity of the ground detection transmitter 124, so long as the RF signals sent from the ground detection transmitter 124 can be received by the stationary receiver 116. The receiver circuitry 116B may be mounted on any stationary component of the brushless AC exciter 110, such as a stationary field structure 114B of the main exciter 114. The stationary receiver 116 is in communication with an alarm (not shown in this embodiment) having an associated alarm indicating circuit as discussed above for the embodiment of FIGS. 1-4.

Use of the ground detection transmitter 124 to monitor for ground faults in the excitation circuit 120 and to communicate with the ground detection receiver 116 is substantially the same as discussed above for the embodiment of FIGS. 1-4. However, rather than emitting an optical signal when no ground fault is detected as in the embodiment illustrated above, the ground detection transmitter 124 emits an RF signal when no ground fault is detected. The RF signal is received by the antenna loop 116A and transmitted to the receiver circuitry 116B. Upon a detection of a ground fault in the excitation circuit 120, the ground detection transmitter 124 emits a modified RF signal that is received by the antenna loop 116A and transmitted to the receiver circuitry 116B, which then may trigger the alarm as discussed above. When the alarm is triggered, appropriate steps can be taken for correcting the problem. It is understood that the ground detection transmitter 124 may terminate the signal emitted therefrom corresponding to a ground fault condition when a ground fault is detected by the ground detection transmitter 124 rather sending a modified signal without departing from the spirit and scope of the invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A ground detection apparatus for use in a power generating system including an excitation circuit and a driven rotatable shaft, the ground detection apparatus comprising:
   a ground detector ring disposed on the rotatable shaft of the power generating system;
   a ground detection transmitter mounted on said ground detector ring and in electrical communication with the excitation circuit of the power generating system, wherein said ground detection transmitter is utilized to detect ground faults in the excitation circuit and to send a signal associated with said ground faults detected thereby;
   a ground detection receiver associated with a stationary portion of the power generation system and in non-contacting communication with said ground detection transmitter for receiving said signal associated with said ground faults detected and sent by said ground detection transmitter; and
   wherein at least one fastener is utilized to mount said ground detection transmitter to said ground detector ring, wherein said ground detector ring includes at least one aperture formed therein for receiving said at least one fastener, wherein said at least one fastener facilitates a mounting of a mounting structure to said ground detector ring, said mounting structure including said ground detection transmitter mechanically coupled thereto, wherein said mounting structure comprises a bracket being L-shaped in cross section, wherein said bracket is formed from one of aluminum, an aluminum alloy, and a non-conductive material.

2. The ground detection apparatus according to claim 1, wherein said signal associated with said ground faults detected and sent by said ground detection transmitter and received by said ground detection receiver is one of a radio frequency signal and an optical signal.

3. The ground detection apparatus according to claim 1, wherein the excitation circuit is associated with a diode wheel assembly and comprises electrical communication with at least field windings of a main generator.

4. The ground detection apparatus according to claim 3, wherein said diode wheel assembly is disposed on the rotatable shaft and is axially displaced thereon from said ground detector ring, and said ground detector ring is disposed on the rotatable shaft and is positioned at a location defined between one of:
 a) a permanent magnet generator and a main exciter and
 b) said diode wheel assembly and said main generator.

5. The ground detection apparatus according to claim 1, further comprising at least one counterbalancing weight assembly mounted on said ground detector ring to counterbalance the weight of said ground detection transmitter on said ground detector ring.

6. The ground detection apparatus according to claim 1, wherein said ground detection receiver is associated with a stationary portion of a main exciter that is radially displaced from said ground detector ring.

7. The ground detection apparatus according to claim 1, wherein the electrical communication between said ground detection transmitter and the excitation circuit comprises an electrical connection extending from the excitation circuit to said ground detection transmitter.

8. An electronic ground detection apparatus for use in a power generating system including an excitation circuit and a driven rotatable shaft, the ground detection apparatus comprising:
 a ground detector ring disposed on the rotatable shaft of the power generating system and having apertures formed therein for receiving at least one fastener;
 a ground detection transmitter mounted on said ground detector ring and in electrical communication with the excitation circuit of the power generating system, wherein said ground detection transmitter is utilized to detect ground faults in the excitation circuit and to send a signal associated with said ground faults detected thereby, and wherein said at least one fastener facilitates a mounting of a mounting structure to said ground detector ring, said mounting structure including said ground detection transmitter mechanically coupled thereto;
 a ground detection receiver associated with a stationary portion of said power generation system and in non-contacting communication with said ground detection transmitter for receiving said signal associated with said ground faults detected and sent by said ground detection transmitter; and
 wherein said mounting structure comprises a bracket being L-shaped in cross section,
 wherein said bracket is formed from one of aluminum, an aluminum alloy, and a non-conductive material.

9. The ground detection apparatus according to claim 8, wherein said signal associated with said ground faults detected and sent by said ground detection transmitter and received by said ground detection receiver is one of a radio frequency signal and an optical signal.

10. The ground detection apparatus according to claim 8, wherein the excitation circuit is associated with a diode wheel assembly and comprises electrical communication with at least field windings of a main generator.

11. The ground detection apparatus according to claim 10, wherein said ground detector ring is disposed on the rotatable shaft and is positioned at a location defined between one of:
 a) a permanent magnet generator and a main exciter and
 b) said diode wheel assembly and said main generator.

12. The ground detection apparatus according to claim 8, further comprising at least one counterbalancing weight assembly mounted on said ground detector ring to counterbalance the weight of said ground detection transmitter on said ground detector ring.

13. The ground detection apparatus according to claim 8, wherein said ground detection receiver is associated with a stationary portion of a main exciter that is radially displaced from said ground detector ring.

14. An electronic ground detection apparatus for use in a power generating system including an excitation circuit and a driven rotatable shaft, the ground detection apparatus comprising:
 a ground detector ring disposed on the rotatable shaft of the power generating system and having apertures formed therein for receiving at least one fastener, wherein said ground detector ring is disposed on the rotatable shaft and is positioned at a location defined between one of:
 a) a permanent magnet generator and a main exciter and
 b) said diode wheel assembly and said main generator;
 a ground detection transmitter mounted on said ground detector ring and in electrical communication with the excitation circuit, wherein the excitation circuit is associated with a diode wheel assembly and comprises electrical communication with at least field windings of said main generator, said diode wheel assembly being disposed on the rotatable shaft and axially displaced thereon from said ground detector ring, wherein said ground detection transmitter is utilized to detect ground faults in the excitation circuit and to send a signal associated with said ground faults detected thereby, and wherein said at least one fastener rigidly affixes a mounting bracket to said ground detector ring, said mounting bracket including said ground detection transmitter mechanically coupled thereto; and
 a ground detection receiver associated with a stationary portion of said power generation system and in non-contacting communication with said ground detection transmitter for receiving said signal associated with said ground faults detected and sent by said ground detection transmitter.

* * * * *